July 9, 1940.　　　G. B. HAVEN　　　2,207,196
MILK AND CREAM DISPENSER
Filed April 13, 1939　　　3 Sheets-Sheet 3
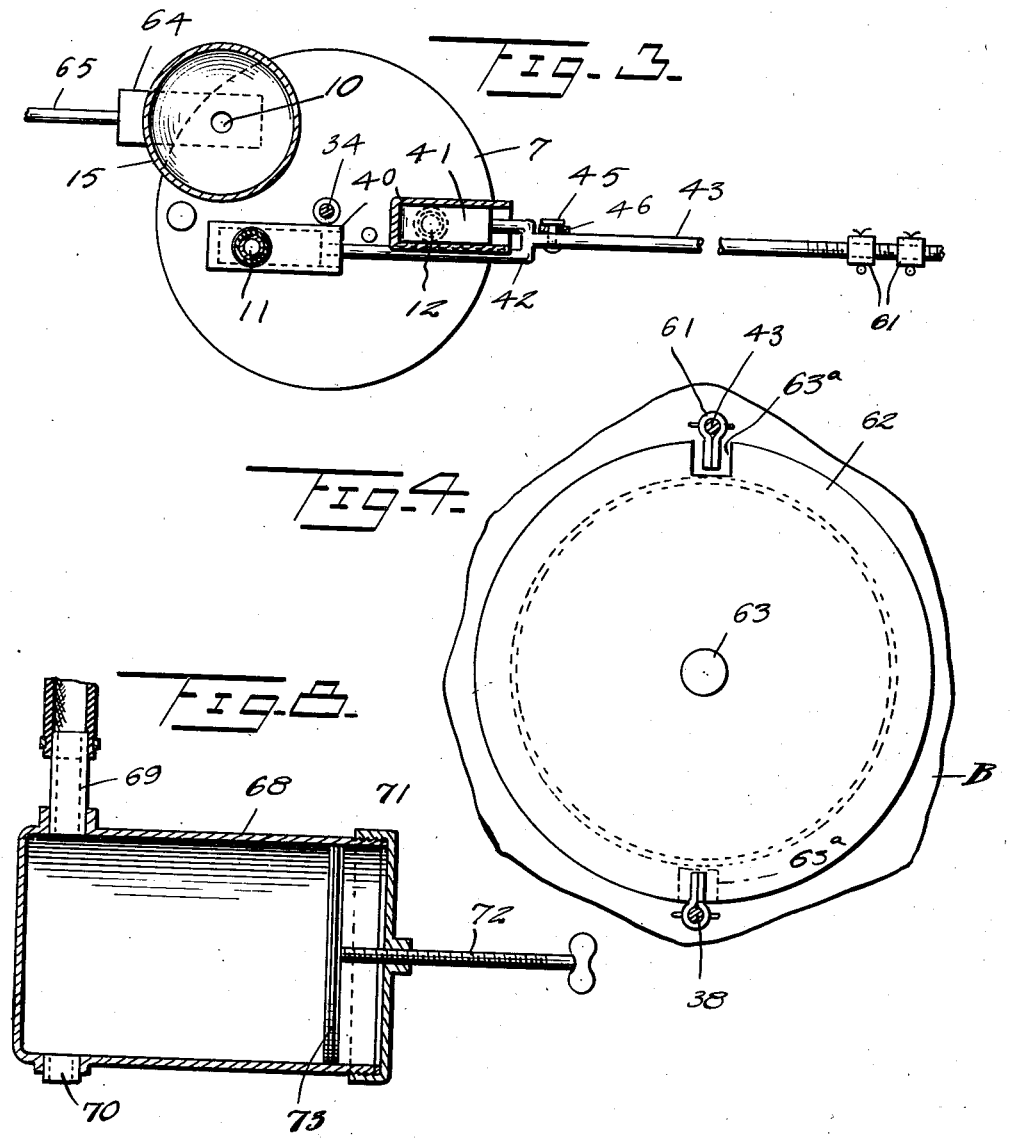

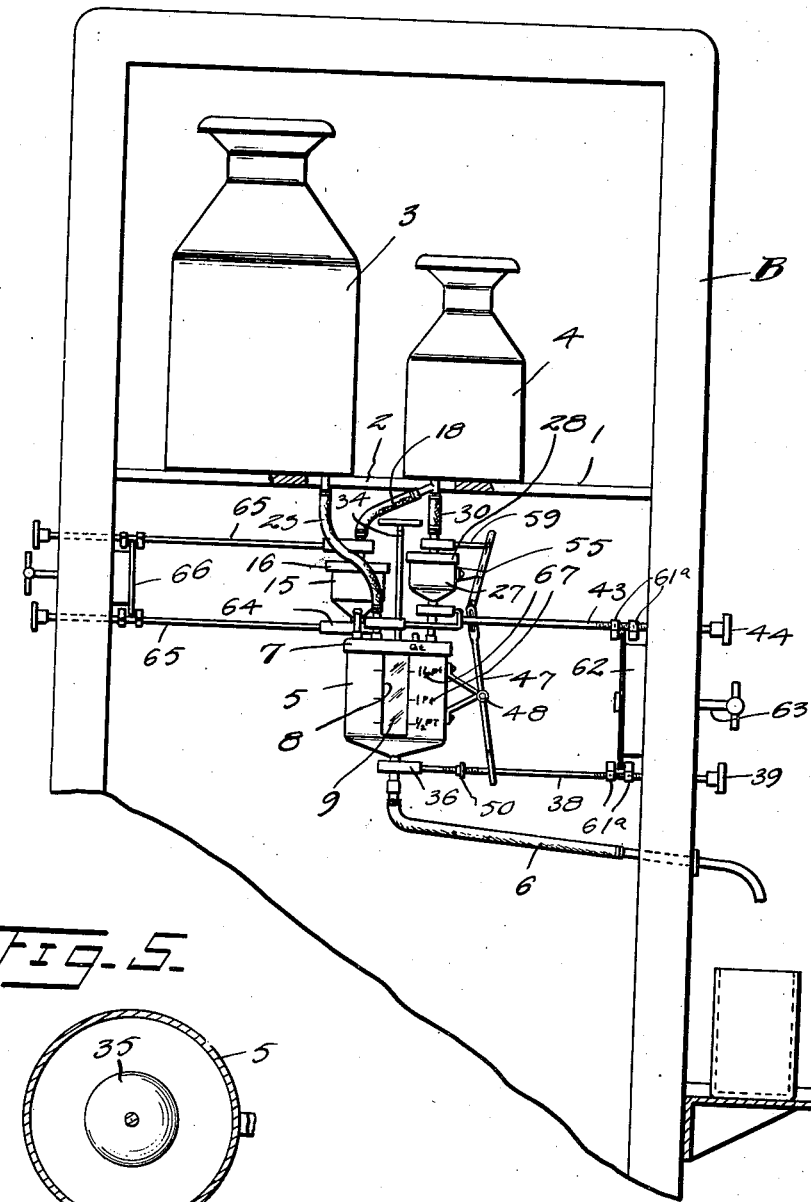

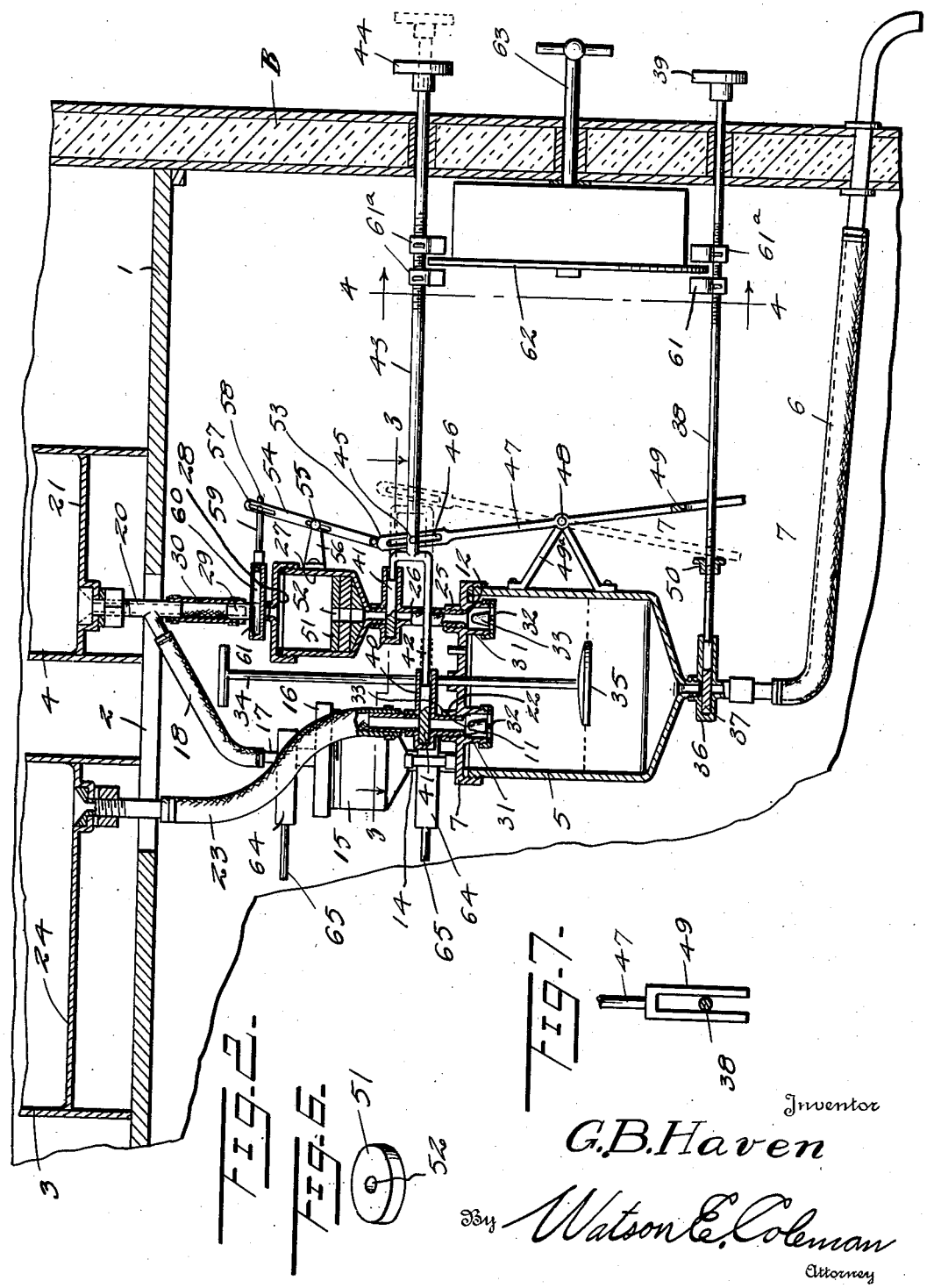

Patented July 9, 1940

2,207,196

UNITED STATES PATENT OFFICE 2,207,196

MILK AND CREAM DISPENSER

George B. Haven, Lime Springs, Iowa

Application April 13, 1939, Serial No. 267,675

6 Claims. (Cl. 221—96)

This invention relates to a milk and cream dispenser, and it is an object of the invention to provide a device of this kind whereby milk may be dispensed containing a predetermined percentage of cream or, if desired, cream may be independently delivered.

As is well known in the dairy industry the cream is separated from the milk and then remixed for sale to the consumer to provide a milk having the percentage of butter fat as may be required in the community in which the milk is to be sold. A further object of the invention is to provide means whereby this remixing may be readily accomplished at the time the milk is delivered to the consumer.

A still further object of the invention is to provide a device of this kind comprising a mixing container from which the milk is to be discharged together with means for delivering to such container milk and cream to be mixed and in a manner whereby the milk dispensed will be of uniform test.

The invention consists in the details of construction and in the combination and arrangement of the several parts of my improved milk and cream dispenser whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a diagrammatic view in elevation illustrating a milk and cream dispenser constructed in accordance with an embodiment of my invention;

Figure 2 is an enlarged detailed sectional view illustrating certain details of construction as herein embodied;

Figure 3 is a detailed sectional view taken substantially on the line 3—3 of Figure 2;

Figure 4 is a detailed sectional view taken substantially on the line 4—4 of Figure 2;

Figure 5 is a transverse sectional view taken through the mixing container;

Figure 6 is a view in perspective of one of the disks for placement within the cream measuring container;

Figure 7 is a detailed sectional view taken substantially on the line 7—7 of Figure 2;

Figure 8 is a view partly in section and partly in elevation illustrating a cream measuring container constructed in accordance with another embodiment of my invention.

As disclosed in the accompanying drawings, B denotes a box of desired dimensions and configuration and which is comprised in a suitable refrigerating system whereby the temperature of the box B may be maintained as desired. As no part of the refrigerating system forms part of the present invention it is not believed that a detailed disclosure thereof is necessary. It is also to be stated that the box B may be of such style or design as best meets with the requirements of practice or as may be preferred by the individual user. It is to be further stated at this time that it is the general purpose that one of my improved apparatus be located at a depot or station where the consumers may go to purchase their milk or cream with, of course, a resultant saving. However, I do not care to be understood as limiting myself in this respect.

As diagrammatically illustrated in the accompanying drawings, the box B is provided with a supporting shelf or structure 1 having a suitably positioned opening 2 preferably in the center thereof. Mounted upon the shelf 1 are two containers 3 and 4. These containers as herein illustrated are of different capacities, the larger container being for the skimmed milk and the container 4 to contain the cream to be mixed with the milk at the time of dispensing.

At a suitable point below the support or shelf 1 there is positioned within the box B a mixing container 5 and leading from the bottom portion of this container 5 to a suitable point of discharge is a delivery conduit 6. The top of the mixing container 5 is initially open but is closed by a cap 7 herein disclosed as of a type threading upon the container and in practice this cap 6 is of metal.

The peripheral wall of the mixing container 5 is provided from top to bottom with a window 8 closed by a transparent plate 9 whereby visual access may be had within the container 5 to readily determine the liquid level therein.

As the means for supporting the container 5 forms no part of the present invention it is not believed necessary that such means be described and illustrated.

The cap 7 as herein disclosed is provided with three openings 10, 11 and 12, the openings 11 and 12 being in radial alignment. In communication with the container 5 through the opening 10 is a discharge line 14 depending from a container 15 of predetermined capacity, as for example one-half pint. The top cap 16 for this container 15 has disposed therethrough for delivery within the container 15 a nozzle 17 carried by the discharge end of the pipe line 18 leading from and in communication with the discharge nipple 20 carried by and depending from the bottom 21 of the cream container 4. The container 15 is used when it is desired to deliver to the consumer cream the control of the discharge from said container 15 being hereinafter more particularly explained.

The opening 11 is defined by an upstanding boss 22 to which is coupled the lower end portion of a pipe line 23 leading from the milk container 3 and in communication therewith through the bottom 24 of such container. The opening 12 is defined by an upstanding boss 25 to which is coupled the pipe line 26 depending from a cream measuring container 27. The top cap 28 of this container 27 is coupled, as at 29, to the pipe line 30 leading from the nipple 20 whereby the cream within the container 4 may be delivered to the measuring container 27. Depending from the cap 7 for the container 5 and substantially defining the openings 11 and 12 are the sleeves 31 having their ends closed by the spiders 32. Within these sleeves 31 are positioned the float or buoyant members or valves 33 so that when the container 5 is properly filled these valves 33 will rise and close return flow through the lines 23 and 26. Slidably disposed through the cap 7 at the axial center thereof is a rod or plunger 34. The inserted end of this plunger or rod 34 carries a dasher or agitating member 35 so that upon reciprocation of the rod or plunger 35 the milk and cream delivered within the container 5 may be properly agitated to assure mixture. In the accompanying drawings the rod or dasher 34 is shown of a type to be manually operated but it is to be stated that if preferred it may be mechanically driven.

Interposed in the line 6 and preferably closely adjacent to the container 5 is a valve casing 36 in which is mounted the slide valve 37. This slide valve 37 is carried by an elongated rod 38 herein disclosed as extending exteriorly of the box B through a wall thereof and having its extended end portion carrying an enlargement or head 39 whereby said rod may be readily manipulated. When this valve 37 is in one position, as illustrated in Figure 2, flow out through the line 6 is cut off while, of course, when the valve 37 is moved into its second position the content of the container 5 may readily flow out through the line 6.

The lines 23 and 26 also have interposed therein the valve casings 40 in which operate the slide valve members 41. The valve casing 40 in the line 26 is between the containers 5 and 27. These valve members 41 are connected by the suitably formed rod 42 for unitary movement and in the same direction. When at the limit of their movement in one direction the valves 41 close the flow through the lines 23 and 26 into the container 5 while, of course, when in their second position said valves 41 permit such flow.

Connected to the rod 42 is an operating rod 43 which, as illustrated in Figure 1, extends exteriorly of the box B through the same wall as the rod 38 and the outer end portion of this rod 43 carries an enlargement or head 44 to facilitate its manipulation.

Extending laterally from the rod 43 is a headed member or lug 45 which extends through a slot 46 provided in the upper end portion of a lever 47. This lever 47 at substantially midway its ends is pivotally connected, as at 48, to the outstanding bracket 49 carried by the container 5. The lower portion of this lever 47 carries a fork 49 which straddles the rod 38 hereinbefore referred to. When the valve members 41 are in their closed position the fork 49, as illustrated in Figure 2, will be sufficiently spaced from the contact sleeve 50 carried by the rod 38 to allow the rod 38 to move outwardly a distance sufficiently to bring the valve member 37 into open position. However, when the valve members 41 are in open position the fork 49 and the stop member 50 require that the valve member 37 be in closed position and upon moving the rod 38 to open the valve member 37 the member 50 will contact with the fork 49 and swing the upper end of the lever inwardly to return the valve members 41 to their closed position. By this it is believed to be understood that when the valve member 37 is in open position the valve members 41 will be in closed position.

In the present embodiment of my invention the measuring container 27 has a major capacity of one-half pint but such capacity may be reduced as desired by placing within the container 27 one or more disks 51 each of which has a central opening 52 to allow for the proper passage of the cream therethrough to the pipe line 26.

Operatively engaged, as at 53, with the upper end portion of the lever 47 is a second lever 54. This lever 54 at substantially midway its ends, as at 55, is supported for swinging movement by the bracket 56 extending out from the container 27. The upper end portion of this lever 54 is slotted, as at 57, to receive a laterally disposed lug or pin 58 carried by the extended end portion of an operating rod 59 carrying the slide member 60 operating in the casing 61 interposed in the line 30. This valve member 60 is in open position when the valve members 47 are in closed position and vice versa.

The rods or plungers 43 are each provided with a pair of spaced lugs 61 between which is adapted to be received the peripheral portion of a rotatable member 62. This member 62 may be manually rotated by a shaft 63 or otherwise as preferred. When the member 62 is engaged between the lugs 61 the rods 43 are held against endwise movement in either direction and such holding action occurs when the valve members 36 and 41 are in closed position.

The peripheral portion of this member 62 is provided with a cut out or recess 63 and when the member 62 is rotated to bring this cut out or recess 63 into proper position with respect to the lugs 61 carried by the rod or plunger 43 said plunger may be pulled outwardly, as indicated by broken lines in Figure 2, to open the valve members 41 and closing the valve members 60. This will allow milk from the container 3 together with the measured amount of cream within the container 27 to flow into the container 5, the amount of milk and cream being in accordance with a predetermined ratio. The container 27 will empty before the container 5 is filled and when the proper amount of liquid has been received within the container 5 the floats or buoyant members 32 will rise and close the lines 23 and 26 against retrograde flow.

When the valves 41 and 60 are opened the lever 47 will be in the position as indicated by broken lines in Figure 2.

After the container 5 has received the desired amount of milk and cream the rod or plunger 34 may be operated to assure desired mixing of said milk and cream.

After the container 5 has been filled the member 61 is rotated to bring the cut out or recess 63 in proper position with respect to the plunger or rod 38 to allow said rod 38 to be operated to open the valve 37. During this operation it is to be noted that the rod 43 is effectively locked against outward movement and it will also be equally apparent that when the rod or plunger 43 is in its outer position the rod or plunger 38 is locked against outward movement. It is to be stated at this time that with the use of the rotatable member 62 the contact member 50 will be ineffective although there will be assemblies wherein the member 62 will be omitted.

It is also to be stated that when the member 62 is used it may be under control of any desired check controlled apparatus or there may be a suitably provided index to readily determine the location of the cut out or recess 63. It is also to be stated that normally the member 62 is preferably in a position to have the cut out portion or recess 63 so positioned as to permit the desired manipulation of the rod 38 while, of course, when the member 62 is not used the position of the lever 47 as indicated by full lines in Figure 2 will allow such independent operation of the rod or plunger 38.

The line 14 and the nozzle 17 hereinbefore referred to also have interposed therein the valve casings 64 in each of which is mounted a slide valve (not shown) carried by an operating rod or plunger 65. When one of the valves within the casing 64 is closed the other is open. In the present embodiment of my invention the operation of the rods 65 is under control of a rotatable member 66 as hereinbefore set forth with respect to the rods or plungers 38 and 43. It is, therefore, believed unnecessary that a further detailed description be given.

When it is desired to purchase cream the valve within the upper casing 64 is closed and the valve in the lower casing 64 is opened. The cream within the container 15 will then flow into the container 5 and as the rod or plunger 38 is adjusted to move the valve 37 into open position said cream will pass out through the delivery pipe 6.

As illustrated in Figure 1, the outer face of the container along the window 8 is provided with the indications 67 whereby it may be readily determined the amount of liquid within the container 5 before the valve 37 is moved into open position.

In the embodiment of my invention as illustrated in Figure 8, 68 denotes a measuring container having its axes horizontally disposed. This container 68 is for coaction with the container 4 and has in communication therewith a line 69 for communication with the container 4 and a discharge line 70 for communication with the container 5. One end of this container 68 is closed by a removable cap 71 and threaded through the axial center of this cap 71 is a shank 72. The inserted end of the shank 72 carries a disk or head 73 which snugly fits within the container 68. By selectively adjusting this head or disk 73 axially of the container 68 the capacity of the container 68 may be varied.

From the foregoing description it is thought to be obvious that a milk and cream dispenser constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A milk and cream dispenser comprising a mixing container having a discharge, two lines delivering within the mixing container, one line leading from a source of milk supply and the other line leading from a source of cream supply, a valve for controlling the flow through the discharge, valves for controlling the flow through the two lines, means for connecting said valves for unitary movement in the same direction, and means effective when the liquid within the mixing container reaches a predetermined level to close the lines against return flow through the lines of the liquid within the container.

2. A milk and cream dispenser comprising a mixing container having a discharge, two lines delivering within the mixing container, one line leading from a source of milk supply and the other line leading from a source of cream supply, a valve for controlling the flow through the discharge, valves for controlling the flow through the two lines, means for connecting said valves for unitary movement into opened or closed positions, a measuring container interposed in one of said two lines, a valve for controlling the flow into the measuring container, means for moving said last named valve into closed position when the valves in the said two lines are moved into open position and vice versa, and means within the container effective when the container is substantially filled with liquid to close the lines against return flow of liquid from within the container.

3. A milk and cream dispenser comprising a mixing container, two pipe lines discharging within the container, one of said lines leading from a source of milk supply and the other of said lines leading from a source of cream supply, a discharge line for the container, a valve for regulating the flow through the discharge line, valves for regulating the flow thru said two lines, means for operating the valves in the said two lines in unison, means for moving the valves in said two lines into closed position when the valve in the discharge line is moved into open position, and an agitating means working within the container.

4. A dispensing apparatus comprising a mixing container, two pipe lines leading from liquid sources discharging within the container, a discharge line for the container, a valve for regulating the flow through the discharge line, valves for regulating the flow through said two lines, means for operating the valves in the said two lines in unison, means for holding the valves in said two lines in closed position when the valve in the discharge line is moved into open position, buoyant valve members within the container, and means for positioning said valve members to rise with the liquid within the container when said container is substantially filled for closing the pipe lines against return flow therethrough of the liquid within the container.

5. A dispensing apparatus comprising a mixing container, two pipe lines leading from liquid sources discharging within the container, a discharge line for the container, a valve for regulating the flow through the discharge line, valves for regulating the flow through said two lines, means for operating the valves in the said two lines in unison, means for holding the valves in said two lines in closed position when the valve in the discharge line is moved into open position, means for holding the valve in the discharge line against opening movement when the valves in the said two lines are moved into open position, and means under control of the liquid received within the container for closing the pipe lines against return flow therethrough of the liquid within the container.

6. A dispensing apparatus comprising a container, a pipe line leading from a liquid source discharging within the container, a discharge line leading from the container, a valve for regulating the flow of the liquid through the pipe line to the container, a valve for regulating the flow through the discharge line, means for operating said valves in unison to close one of said valves when the other is open, a buoyant valve member within the container, and means for positioning said valve member to close the pipe line against return flow of liquid within the container when said container is substantially filled.

GEORGE B. HAVEN.